United States Patent
Monacos

[19]

[11] Patent Number: 6,101,013
[45] Date of Patent: Aug. 8, 2000

[54] OPTICAL CIRCUIT SWITCHED PROTOCOL

[75] Inventor: Steve P. Monacos, Altadena, Calif.

[73] Assignee: The United States of America as represented by the Administrator of the National Aeronautics and Space Administration, Washington, D.C.

[21] Appl. No.: 09/024,868

[22] Filed: Jan. 30, 1998

[51] Int. Cl.[7] .................................................. H04J 14/08

[52] U.S. Cl. .................... 359/139; 359/117; 359/138; 359/140

[58] Field of Search .................................... 359/139, 138, 359/140, 117, 165; 370/357, 360, 389, 386, 392

[56] References Cited

U.S. PATENT DOCUMENTS

| | | |
|---|---|---|
| 5,073,980 | 12/1991 | Prucnal et al. . |
| 5,249,178 | 9/1993 | Kurano et al. . |
| 5,253,250 | 10/1993 | Schlafer et al. . |
| 5,278,689 | 1/1994 | Gitlin et al. ............................ 359/137 |
| 5,347,450 | 9/1994 | Nugent . |
| 5,377,182 | 12/1994 | Monacos .................................. 370/16 |
| 5,398,317 | 3/1995 | Nugent . |
| 5,446,571 | 8/1995 | Shabeer . |
| 5,488,501 | 1/1996 | Barnsley . |
| 5,581,388 | 12/1996 | Gambini et al. . |
| 5,617,233 | 4/1997 | Boncek . |
| 5,617,413 | 4/1997 | Monacos . |

*Primary Examiner*—Leslie Pascal
*Assistant Examiner*—Hanh Phan
*Attorney, Agent, or Firm*—John H. Kusmiss

[57] ABSTRACT

The present invention is a system and method embodied in an optical circuit switched protocol for the transmission of data through a network. The optical circuit switched protocol is an all-optical circuit switched network and includes novel optical switching nodes for transmitting optical data packets within a network. Each optical switching node comprises a detector for receiving the header, header detection logic for translating the header into routing information and eliminating the header, and a controller for receiving the routing information and configuring an all optical path within the node. The all optical path located within the node is solely an optical path without having electronic storage of the data and without having optical delay of the data. Since electronic storage of the header is not necessary and the initial header is eliminated by the first detector of the first switching node, multiple identical headers are sent throughout the network so that subsequent switching nodes can receive and read the header for setting up an optical data path.

21 Claims, 4 Drawing Sheets

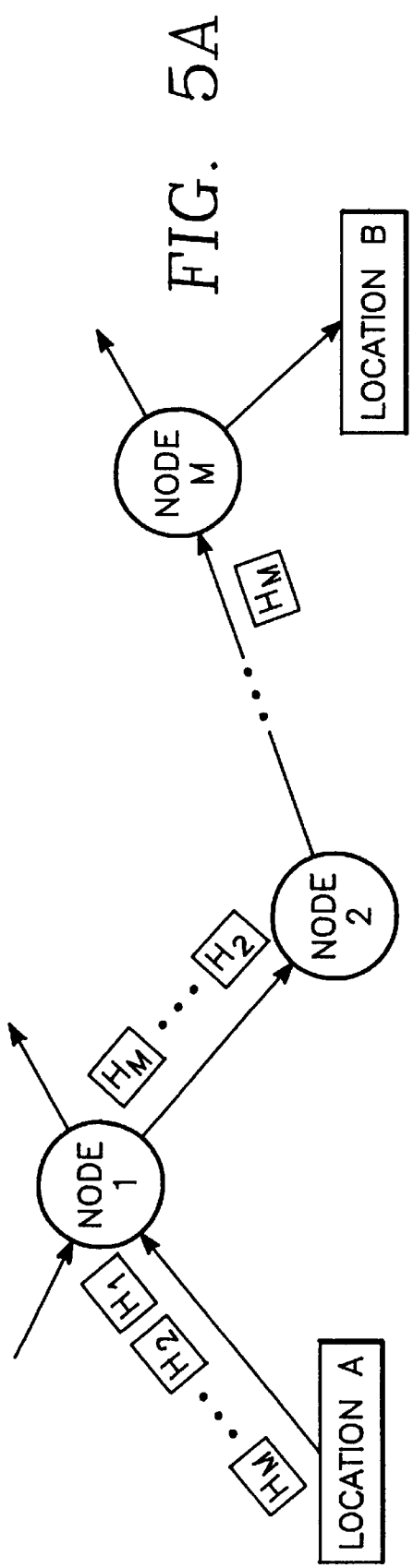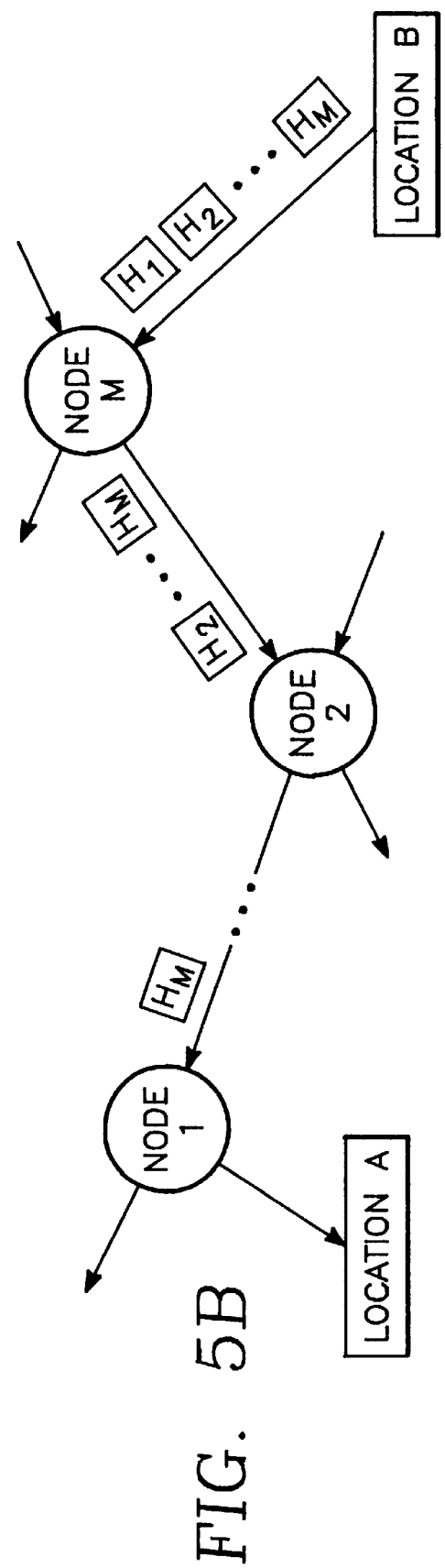

OPTICAL CIRCUIT SWITCHED PROTOCOL

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The present invention relates in general to data communications and in particular to a new optical circuit switched protocol for transmitting data.

BACKGROUND

Data transfer is becoming increasingly important, especially between a source and a destination located on a network, such as a wide area network or the internet. Typically, a network comprises a plurality of locations (which intermittently act as sources or destinations) coupled together by a plurality of switching nodes. Switching nodes are used since it is impossible or impractical to connect all locations together directly. The switching nodes are situated between all of the locations for forming communication paths between locations. As such, all of the locations are connected to each other via the switching nodes to provide at least one, and often several communication paths between given locations.

A data packet, which usually comprises a header and a data payload can then be sent between locations via the switching nodes. The header typically contains, among other things, address information which is used to route the data packet through the switching nodes. The data payload contains the actual data that is to be sent between locations. In typical systems, each switching node decodes the header and then switches the data packet onto a proper communication data path so that the data packet can proceed through the switching nodes within the network to the desired destination location.

Several protocol schemes exist for data transfer over networks. The first protocol is referred to as a "store-and-forward" protocol. In this scheme, the data portion of the packet typically follows the end of the header immediately. Since the packet is in electronic form, the packet can be conveniently stored for an arbitrary period of time in electronic memory without signal degradation. The second protocol involves sending out a header to establish a data path before any data is sent. The data portion of the packet is sent only after an acknowledge signal is received from the destination location.

However, these protocols have several disadvantages. First, the "store-and-forward" protocol requires expensive electronic data paths within switching nodes. For example, expensive storage devices are required at each switching node for storage of the header. This is because only one header is used to setup the input/output (I/O) connections in all intermediate switching nodes. In addition, since this protocol routes data electronically, the transmission of the data through the switching nodes is slower as compared with the high link bandwidths achievable with all optical networks.

Next, for the second protocol, not only must the original header be stored at each switching node in electronic memory until the path is setup (similar to the first protocol), but an acknowledge "packet" must also route back to the original source to signal that the path is set up. Also, to add to the complexity, the acknowledge "packet" must be stored at intermediate nodes. Further, similar to the first protocol, transmission of data in a network with electronic routing within switching nodes is slower compared with high link bandwidths of all optical communication. Therefore, these schemes are not well suited for routing optical packets without the use of expensive electronic data paths within the switching nodes and do not have the high link bandwidths of networks with all optical communication paths.

Although some networks attempt to use a combination of optical transmission with optical storage devices, these schemes are impractical because existing optical switches have very slow switching times (typically tens of milliseconds). Consequently, these schemes require transmission storage or delay of the packet for a period of time (the switching time of the slow switch) until the data path is set up. This requires the use of expensive and complex variable optical delay lines. For example, storage/delay of the packet in optical form would require thousands of kilometers of fiber to realize tens of milliseconds of delay. This approach is not only cumbersome to implement but results in signal loss and degradation due to the large amount of fiber traversed.

Therefore, what is needed is a communication protocol that allows the transmission of information between switching nodes in as much optical form as possible without any electronic connections in the data paths of the switching nodes and without expensive optical delay lines. What is further needed is a communication protocol that allows all information transmitted between switching nodes (both control headers and data) to be transmitted optically. What is further needed is a protocol that has high link bandwidths utilizing all optical data packet transmission with the ability to use a variety of data formats without modifications to the hardware in the data path.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is a system and method embodied in an optical circuit switched protocol for the transmission of data through a network.

The optical circuit switched protocol of the present invention is an all-optical circuit switched network and includes novel optical switching nodes. Each optical switching node of the present invention transmits optical data packets from a source location to a destination location within a network. Each optical data packet includes a header and a data payload portion. Each optical switching node comprises a detector and a controller. The source location sends multiple headers throughout the network to set up a communication path between the source location and the destination location. After the communication path is set up, the data portion of the optical packet is transmitted over the communication path. A trailer portion can be included in the optical data packet to break down the communication path after all data is sent.

Specifically, the detector receives the optical information and converts it to electronic form. The header detection logic determines the information is a header, translates it into routing information and eliminates the header from the network. The controller receives the routing information and configures an all optical path within the node. The all optical path located within the node is solely an optical path and there is no electronic storage of the data and no optical delay of the data. Since electronic storage of the header is not necessary and the initial header is eliminated by the first detector of the first switching node, multiple identical headers are sent throughout the network so that subsequent switching nodes can similarly receive and read the header for continuing to set up an optical data path. This process is continued through switching nodes throughout the network until a communication path between the source location and the destination location is completed.

A feature of the present invention is that all information transmitted between communication switching nodes remains in optical form. Another feature of the present invention is that electronic control is used solely to configure the route of the optical information and there is no electronic storage or transmission of the data. Another feature of the present invention is that the packet (both the header and the data) remains in optical form when routing through the node. Another feature of the present invention is the capability to use a variety of data formats without modifications to the hardware in the data path.

An advantage of the present invention is that it is well suited to current slow optical switching components using only optical interconnections between switching nodes (i.e. no electronic communication between nodes). Another advantage of the present invention is that since data transmission remains in optical format, high link bandwidths are achieved.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIG. 5A depicts initiation of the communication path for an infinite network of the present invention;

FIG. 5B depicts completion of the communication path for an infinite network of the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview
Overview of Components

Figure 1:
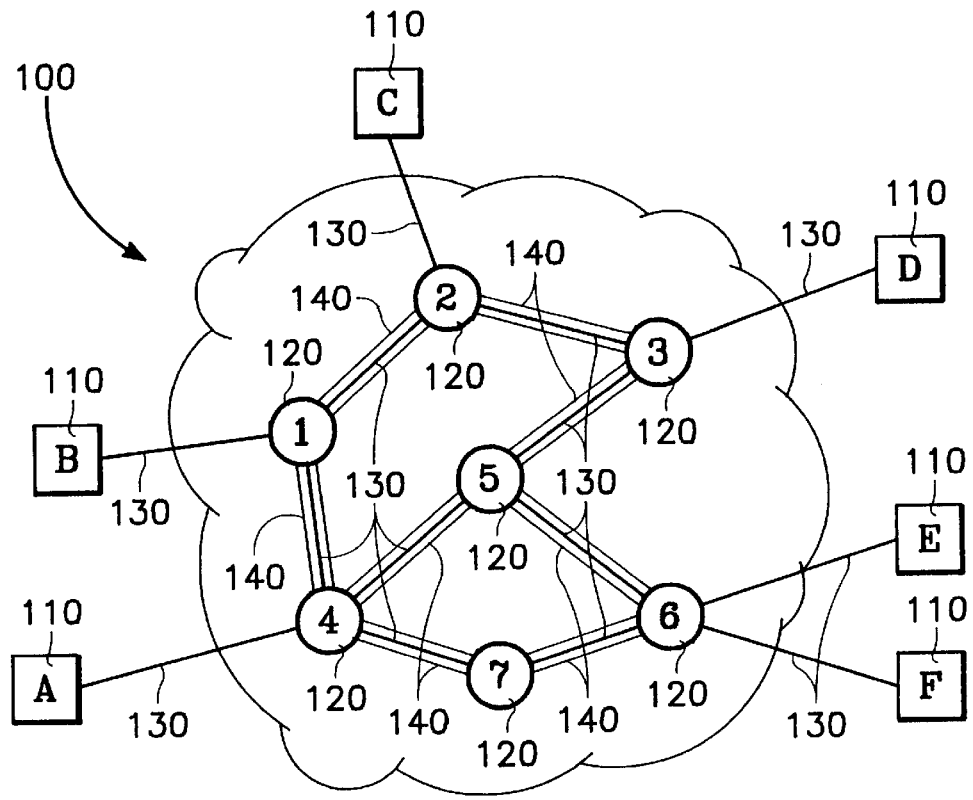
FIG. 1 illustrates an overview configuration of the present invention.

FIG. 1 illustrates an overview configuration of the present invention. For illustrative purposes, a sample network 100 utilized in the present invention is depicted in FIG. 1. The network 100 includes a plurality of locations 110 coupled together by a plurality of switching nodes 120. Each location 110 can intermittently act as a source or destination. The switching nodes 120 are situated between all of the locations 110 and use the links 130 between locations 110 for forming communication paths 140. A communication path is a collection of links and switching nodes used to transfer data between two locations. The links 130 and switching nodes 120 form all-optical communication paths 140. In other words, there is no electronic communication between switching nodes 120.

As shown in FIG. 1, all of the locations 110 are connected to each other via the switching nodes 120 to provide at least one, and often several communication paths 140 using links 130 between the locations 110. Any communication path 140 set up between two locations via the switching nodes will preferably be a dedicated path held for as long as communication is necessary. Hence, after a communication path is set up between two locations via the switching nodes, multiple data packets can be sent using the same communication path for as long as necessary.

Figure 2:
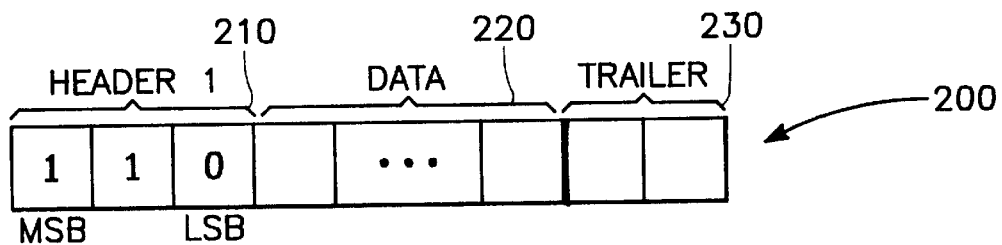
FIG. 2 illustrates the contents of the optical data packet of the present invention.

FIG. 2 illustrates the components of the optical data packet of the present invention. The optical data packet 200 of the present invention contains a header 210, a data payload 220, and a trailer 230. The data payload 220 contains the actual data that is to be sent between desired locations 110 of FIG. 1. The trailer 230 is a conventional trailer used for breaking the optical path as the data payload passes through each switching node 120 of FIG. 1.

The header 210 contains, among other things, address information (i.e., the global ID of the source location and destination location) which is used to route the optical data packet 200 through the network 100 of FIG. 1. The header 210 can be sent in any conventional manner suitable for transferring data. For example, the header 210 can be sent with the most significant bit of a binary value (MSB) first, with the least significant bit of binary value (LSB) last so that the header information is sent serially.

Overview of Operation

Figure 3:
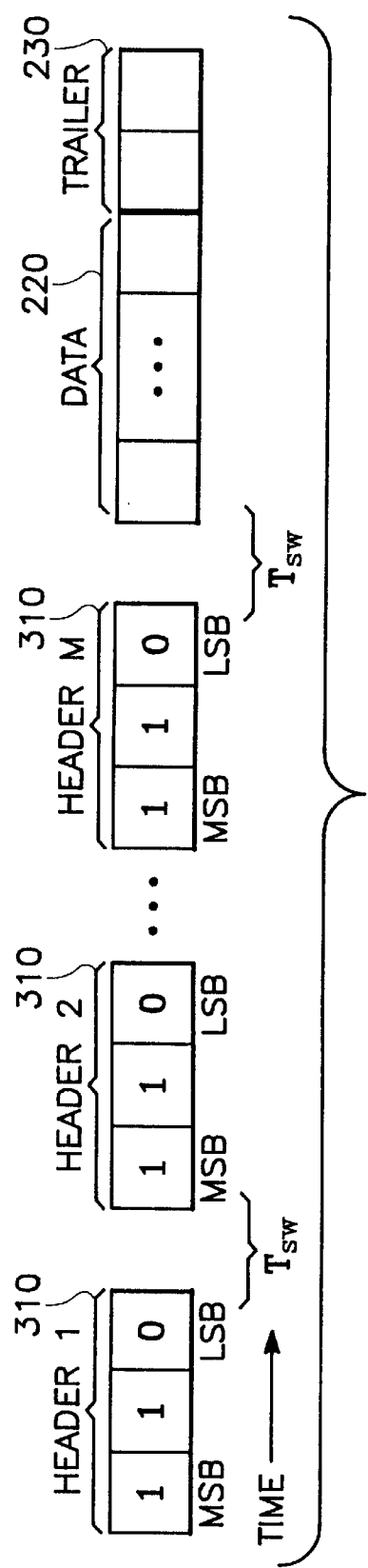
FIG. 3 illustrates the transmission of the optical data packet of the present invention.

FIG. 3 illustrates the transmission of the optical data packet of the present invention. For transmission of the optical packets from one location to another, a plurality of headers 310 are used. The plurality of headers 310 transmitted throughout the network are identical to each other and are intermittently sent through the network with a suitable amount of time delay between consecutive headers, $T_{sw}$. This time delay, $T_{sw}$, between consecutive headers allows subsequent switching nodes in the data path to set up I/O connections before subsequent headers reach subsequent switching nodes. Time delay $T_{sw}$ is a minimum time delay and represents the setup time of the optics of the switching nodes.

For instance, many existing optical switches have very slow switching times (typically tens of milliseconds). A given switching node cannot handle additional information until the data path is set up by the given switching node. The time required to set up the data path is the switching time period Tsw of the particular switch. Since storage of a packet in optical form would require thousands of kilometers of fiber to realize tens of milliseconds of delay, transmission of consecutive headers are merely delayed by a time delay, $T_{sw}$, to accommodate the switching time period.

Subsequent headers are routed through previous switching nodes to subsequent switching nodes without processing by the previous switching nodes and so on. This prevents unnecessary processing of subsequent headers by previous switching nodes, while allowing consecutive switching nodes to set up a partial data path for the transmission of subsequent headers to complete the data path. Thus, each header is processed and read only once by a given switching node which allows the switching node to pass multiple headers without concern of duplicate processing. After the last header 310 is sent to set up a communication path, the data payload 220 is sent with a time delay, Tsw, followed by the trailer 230.

Referring to FIG. 3, for example, header 1 is sent to a switching node connected to a source location 110 to set up an optical data path within the switching node connected to the location. Headers 2 through M are routed through the switching node connected to the location 110 to the next switching node. Header 2 sets up the second switching node in the communication data path. This process is continued until the Mth header has been sent out to guarantee that the communication path has been established. The data portion 220 of the optical data packet 200 is then sent followed by the trailer 230 which is used to break the optical path as it passes through each switching node. Transmission of the optical data packet 200 through the network is described below in detail.

Detailed Operation

Referring to FIG. 1 along with FIGS. 2 and 3, as an example, if location C needs to communicate or send data to location F, first, location C makes a request to node 2 by sending a first header to node 2. Second, node 2 decides whether it is best to route through nodes 1 or 3. Some factors for determining which node to route through include: a) how busy are nodes 1 and 3?; b) how many extra connections are required after nodes 1 and 3?; c) what is the speed of the connection through nodes 1 and 3?; d) what is the cost to route through nodes 1 and 3?, etc. Third, node 2 processes the first header and if it is assumed that node 3 is chosen after considering the factors above, an optical path is set up within node 2 and an optical communication path is set up from node 2 to node 3. Fourth, a second header (identical to the first header) is sent by location C through node 2 to node 3 (via the communication path) after a time delay of $T_{sw}$, which is equal to the switching time of the nodes in the given network.

The time delay, $T_{sw}$, between the transmission of the first header and the second header assures that node 3 has set up an I/0 connection with node 3 before the second header reaches node 3. Also, the second header is routed through node 2 without alteration or consideration to node 3. Node 2 ignores the second header and does not process, alter, consider, or read the second header since node 2 is satisfied with the first header and its configuration of the communication path between node 2 and node 3, based on the first header.

Fifth, node 3 receives and processes the second header and chooses to route through node 5. Sixth, a third header (identical to the first and second headers) is sent by location C through node 2 to node 3 to node 5 after a time delay of $T_{sw}$. The time delay, $T_{sw}$, between the transmission of the second header and the third header assures that node 3 has set up an I/O connection with node 5 before the third header reaches node 3. The third header is routed to node 5 through nodes 2 and 3 without incidence.

Seventh, node 5 receives and processes the third header and chooses to route through node 6. Eighth, a fourth header (identical to the first, second, and third headers) is sent by location C through node 2 to node 3 to node 5 to node 6 after a time delay of $T_{sw}$. The time delay, $T_{sw}$, between the transmission of the third header and the fourth header assures that node 5 has set up an I/O connection with node 6 before the fourth header reaches node 5. The fourth header is routed through nodes 2, 3, and 5 without incidence. Last, node 6 receives and processes the fourth header and chooses to complete the data path by setting up an I/O connection with location F. The data payload 220 is then sent from location C to location F, after a time delay of $T_{sw}$, followed by the trailer 230, via the completed communication path (location A→node 2→node 3→node 5→node 6→ location C).

Bounding in a Finite Network

Figure 4:
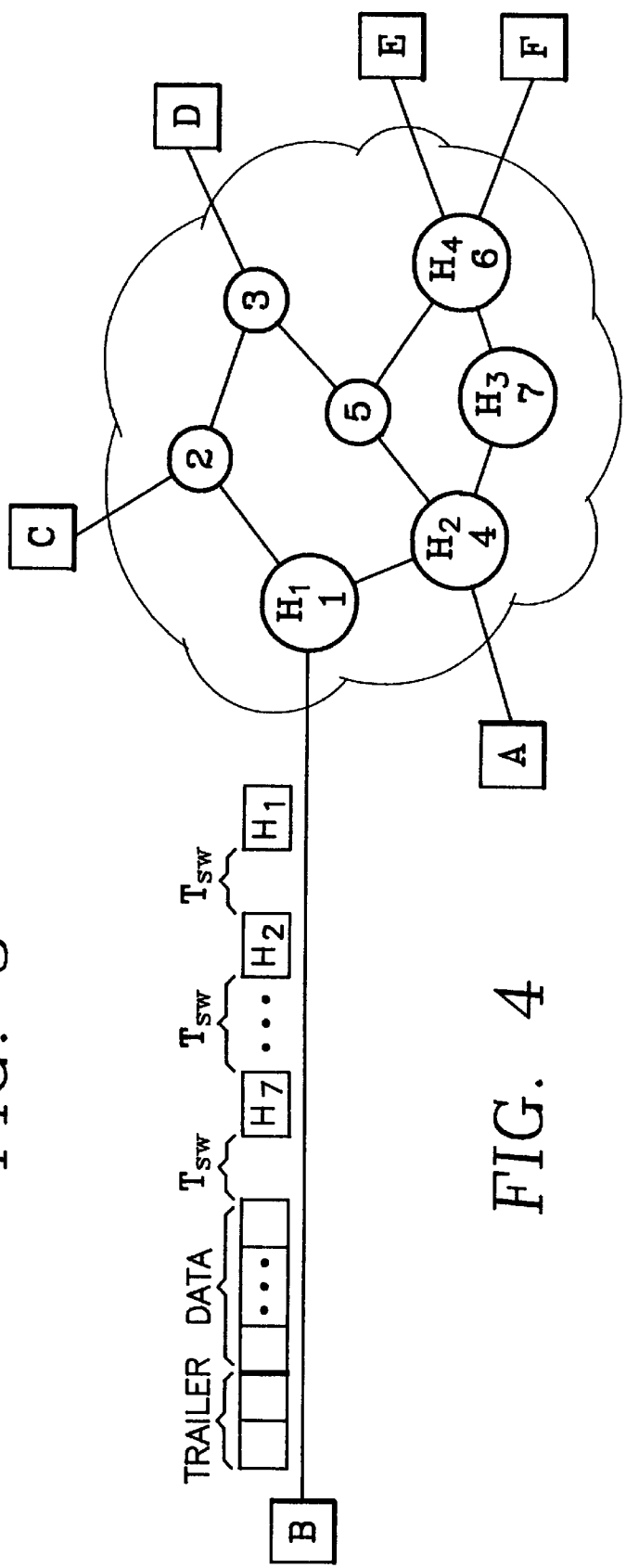
FIG. 4 illustrates the flow of the optical data packet through a finite network of the present invention.

FIG. 4 illustrates the flow of the optical data packet 200 of FIG. 2 through a finite network of the present invention. In a fixed network 400, the network is predefined and finite, i.e., the number of switching nodes and locations are known. The number of optical switching nodes in the communication path is "bounded" and the same number of headers is always sent out to ensure the set up of all switching nodes in the communication path before the data is sent.

Specifically, for a given finite network, the maximum number of switching nodes needed to set up a communication path for communication between any two locations is finite. Consequently, the number of headers needed to set up a communication path for communication between any two locations is bounded by the maximum number of switching nodes in a communication path. As a result, in a finite network, the number of headers to be sent out to create a communication path for communication between any two locations is always equal to the maximum number of switching nodes between any two locations. A "handshake/acknowledge" requirement, which is typically required for large networks (discussed below for an infinite network), is unnecessary and the creation of a communication path is always guaranteed as long as the number of headers sent is equal to the maximum number of switching nodes in a path.

For instance, for illustrative purposes only, FIG. 4 depicts a network 400 with six locations (locations A–F) and seven switching nodes (nodes 1–7). If the maximum number of switching nodes for any communication path is five, the maximum number of switching nodes needed to set up a communication path for communication between any two locations is five. As such, for communication between any two locations, five headers are always sent out to create a communication path.

As shown in FIG. 4, if location B needs to send data to location F, headers 1–5 (five headers since this is the maximum number of switching nodes) are sent intermittently with a delay of $T_{sw}$ between headers. It is assumed that the communication path to be established will be through node 1 to node 4 to node 7 to node 6 to location F. Specifically, first location B sends header 1 to switching node 1, which uses header 1 to set up a path to switching node 4. Second, location B sends header 2 to switching node 1 after a delay of $T_{sw}$. Switching node 1 ignores header 2 and transmits header 2 to switching node 4, which uses header 2 to set up a path to switching node 7. Third, location B sends header 3 to switching node 1 after a delay of $T_{sw}$. Switching node 1 ignores header 3 and transmits it to switching node 4, which ignores header 3 and transmits it to switching node 7, which uses header 3 to set up a path to switching node 6.

Next, location B sends header 4 to switching node 1, after a delay of $T_{sw}$. Switching node 1 ignores header 4 and transmits it to switching node 4, which ignores header 4 and transmits it to switching node 7, which ignores header 4 and transmits it to switching node 6, which uses header 4 to set up a path to location F to complete the communication path. The remaining header (header 5) is sent even though the communication path is already set up. Switching nodes 1, 4, 7, 6, and location F receive and ignore the remaining header 5 since the communication path is already set up. Last, after header 5 is sent, the data and the trailer are sent after a delay of $T_{sw}$ to location F.

Infinite Network

FIGS. 5A and 5B illustrate the flow of the optical data packet 200 of FIG. 2 through an infinite network of the present invention. In an infinite network, the network is not defined and can change vary i.e., the number of switching nodes and locations are not known (for example, the internet). Since the number of optical switching nodes in the data path varies, the amount of headers to be sent out varies to ensure that all switching nodes are set up before the data is sent. In other words, the maximum number of switching nodes needed to set up a communication path for communication between any two locations will never be known. Consequently, the number of headers needed to set up a communication path for communication between any two locations will depend on the actual number switching nodes needed to set up the communication path. Therefore, a "handshake/acknowledge" requirement is necessary to guarantee a communication path connecting two locations.

Since the network of FIGS. 5A and B have an infinite number of switching nodes, the number of switching nodes needed to set up a communication path for communication between any two locations is unknown. As such, for communication between two locations, the numbers of headers to be sent out to create a communication path is not known initially, and thus, multiple headers are continually sent out until the communication path is set up.

FIG. 5A depicts initiation of the communication path. If location A needs to send data to location B, headers 1 through M are sent sequentially with delay $T_{sw}$ between headers. Specifically, assuming the communication path is through node 1 to node 2 to node M to location B, first, location A sends header 1 to switching node 1, which uses header 1 to set up a path to switching node 2. Second, location A sends header 2 to switching node 1, after a delay of $T_{sw}$. Switching node 1 ignores header 2 and transmits it to switching node 2, which uses header 2 to set up a path to switching node M. This process continues until location A sends header M to switching node 1. Switching nodes 1 through M−1 ignore header M and transmit it to switching node M, which uses header M to complete the communication path to location B.

However, since location A is not aware that the communication path is set up, location B must send a plurality of headers, different from the headers sent by location A, to location A to inform ("handshake/acknowledge") location A that the communication path is set up. Consequently, FIG. 5B depicts completion of the communication path. Location B sends header 1 to switching node M, which uses header 1 to set up a path to switching node M−1. Second, location B sends header 2 to switching node M, after a delay of $T_{sw}$. Switching node M ignores header 2 and transmits it to switching node M−1, which uses header 2 to set up a path to the next switching node. This process continues until location B sends header M to switching node 1. Switching nodes 2 through M ignore header M and transmit it to switching node 1, which uses header M to complete the communication path back to location A. Lastly, location A receives header M+1 a time $T_{sw}$ after header M from location B to complete the "handshake/acknowledge", at which time location A sends the data 220 and the trailer 230 to location B.

It should be noted that location A does not stop sending headers through the network until location A acknowledges receipt or handshakes with location B. Although this causes location B to receive additional headers after the path from location A to location B is set up, location B ignores any additional headers sent by location A after the communication path from location A to location B is set up.

Sample Switching Node

Figure 6:
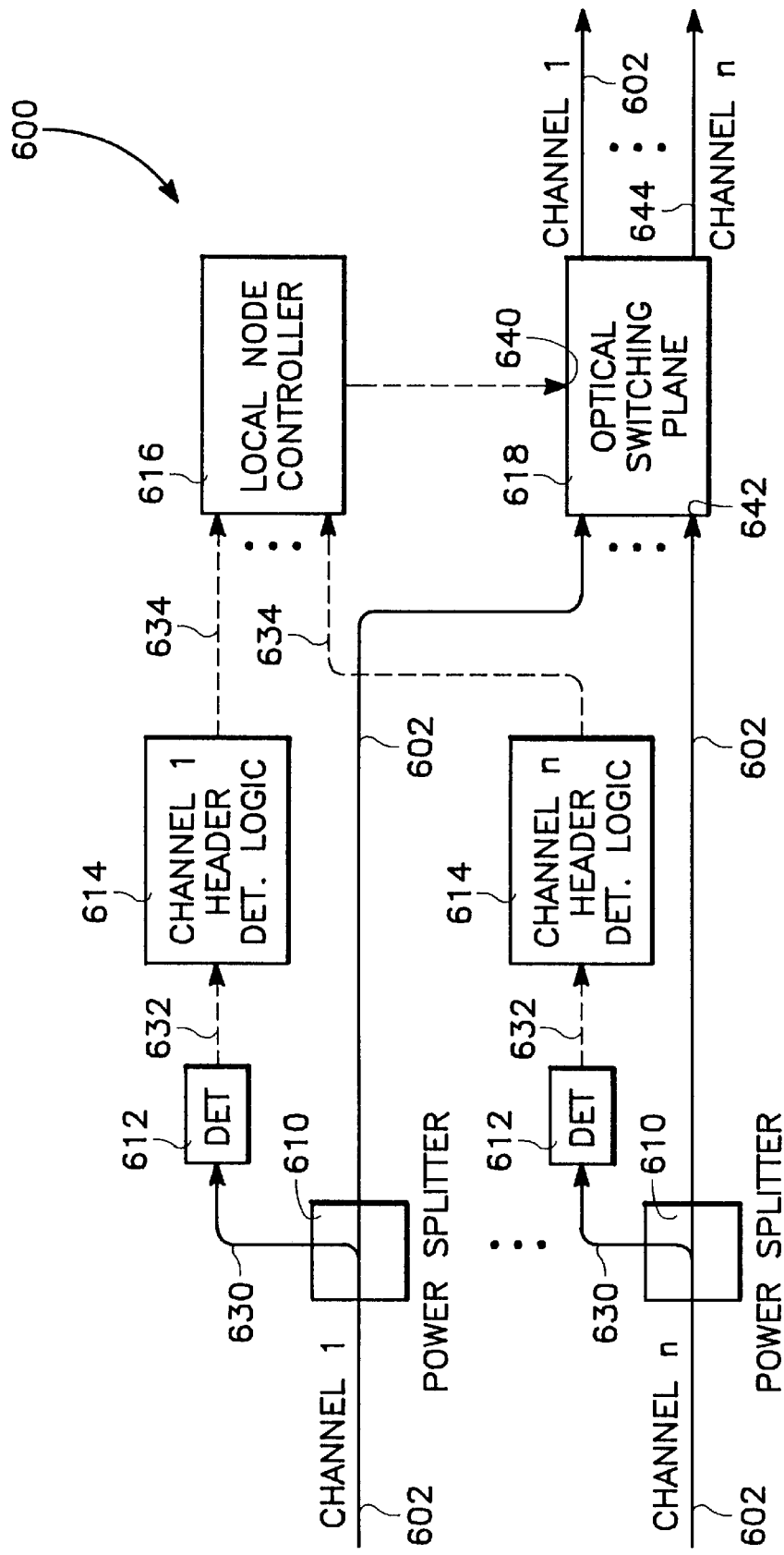
FIG. 6 is a block diagram of a sample switching node of the present invention.

FIG. 6 is a block diagram of a sample switching node of the present invention. The switching node 600 is an optical switching node and transmits optical information 602 within the network of FIGS. 4 and 5A and 5B or any other suitable network. The optical information 602 comprises the header information and the data that is to be transmitted from one location to another, similar to the optical data packets 200 described above in FIGS. 1–4. The header is transmitted first, followed by the data after a communication path is set up between transmitting locations, in accordance with the present invention as described above. The optical information 602 is transmitted through 1 of n channels at each switching node 600.

The switching node 600 includes a power splitter 610, a detector 612, header detection logic 614, a local node controller 616, and an optical switching plane 618 for each channel. Referring to FIG. 2 along with FIG. 5, for each channel, the power splitter siphons off a small amount of energy 630 from the optical information 602 to allow for detection of the contents of the optical information 602. The power splitter 610 can be any conventional power splitter for achieving this function. The amount energy siphoned off to detect the contents of the optical information 602 is dependent on the type of power spitter used.

The detector 612 receives the split off energy 630 from the power splitter 610 and converts the energy 630 into an electrical signal 632. The header detection logic 614 receives the electrical signal 632 from the detector 612 and determines whether the optical information 602 being transmitted to the switching node 600 is the header portion, the data portion, or the trailer. If the header is being transmitted, the header is processed, consumed, and completely eliminated. Only actual address and routing information, as an electrical signal 634, is kept and forwarded to the local node controller 616.

The local node controller 616 receives the electrical signal 634 and uses the electrical signal 634 for configuring optical switches in the switching node 600 to establish input and output connections. The local node controller 616 acts as an access mediator by keeping track of the input and output connections to prevent conflicts between outputs. For instance, the local node controller 616 determines the best route for sending data to avoid traffic congestion. The local node controller 616 can be any conventional local node controller for achieving this function.

The optical switching plane 618 is optical hardware with electrical inputs 640, n optical inputs 642, and n optical outputs 644. The optical switching plane 618 receives electrical control signals from the local node controller 616 at the electrical inputs 640. The electrical control signals contain the routing information created by the local node controller 616. The optical switching plane 618 uses the electrical control signals to route the optical information 602 entering the n optical inputs 642 by transmitting the optical information 602 through the n optical outputs 644. The optical switching plane 618 can be any conventional optical switching plane for achieving this function.

It should be noted that the electrical control signals are completely consumed by the optical switching plane 618 and are used exclusively for setting up an optical route for transferring the optical information 602 through the switching node 600. This process is repeated for subsequent switching nodes in the network until the communication path is set up. After the communication path is set up, the data is sent. When the data and the trailer portion are transmitted to the switching node 600, the data is routed directly to the optical switching plane 618 as an optical signal. The data is never converted to an electrical signal nor is it ever stored by a storage device. The optical switching plane 618 routes the data through from the optical inputs 642 to the optical outputs 644 through the switching node 600 in accordance with the route set up by the local node controller 616.

CONCLUSIONS

In accordance with the present invention, the packet of information transmitted between switching nodes is always kept in an optical format. All information transmitted between switching nodes (both control headers and the actual data) is composed of optical packets without any electronic transmissions or buffering. The packet (header and data) is always kept in optical form within each switching node so that the path within each switching node is always an all-optical path. This configuration provides very high link bandwidths between locations and allows a variety of data formats to be used without modifications to the hardware in the data path.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical circuit switched system for transmitting data from source locations to destination locations within an optical network comprising:

an optical data packet having a header, a data payload portion, and a trailer; and a plurality of optical switching nodes interconnecting the locations of network together, wherein each optical switching node comprises a detector for receiving the header, header detection logic for translating the header into routing information and eliminating the header, and a controller for receiving the routing information and for configuring an all optical path within each node;

wherein said all optical path located within said optical switching node is solely an optical path without having electronic storage of the data and without having optical delay of the data;

wherein multiple identical headers are sent throughout the network so that subsequent switching nodes can receive and read the header for setting up an optical data path.

2. The optical circuit switched system of claim 1, wherein the network has a finite number of optical switching nodes in the network.

3. The optical circuit switched system of claim 2, wherein a predetermined finite number of multiple identical headers are sent throughout the network.

4. The optical circuit switched system of claim 2, wherein a finite number of multiple identical headers equal to the maximum number of optical switching nodes in a communication path are sent throughout the network.

5. The optical switching node of claim 1, wherein said network has an infinite number of optical switching nodes in the network.

6. The optical switching node of claim 5, wherein an infinite number of multiple identical headers are sent throughout the network.

7. The optical circuit switched system of claim 1, wherein multiple identical headers are sent throughout the network until the destination location sends the source location a handshake signal acknowledging receipt of the headers.

8. An optical switching node for transmitting an optical data packet within a network, wherein the optical data packet includes a header, data, and a trailer portion, the optical switching node comprising:

a detector for converting the optical signal to an electrical signal;

a header detection logic device for determining if the information is the header, the data, or the trailer portion, for processing only the header, for translating the header into routing information, and for eliminating the header; and a controller for receiving the routing information and for configuring an all optical data path within the node;

wherein the all optical data path located within the node is solely an optical path without having electronic storage of the data and without having optical delay of the data.

9. The optical switching node of claim 8, further comprising a link for connection of the optical switching node to plural optical switching nodes to define a network.

10. The optical switching node of claim 9, wherein multiple identical headers are sent throughout the network so that subsequent switching nodes can receive and read the header for setting up an optical data path.

11. The optical switching node of claim 10, wherein the network has a finite number of optical switching nodes in the network.

12. The optical switching node of claim 11, wherein a predetermined finite number of multiple identical headers are sent throughout the network.

13. The optical switching node of claim 11, wherein a finite number of multiple identical headers equal to the maximum number of optical switching nodes in a communication path are sent throughout the network.

14. The optical switching node of claim 10, wherein said network has an infinite number of optical switching nodes in the network.

15. The optical switching node of claim 14, wherein an infinite number of multiple identical headers are sent throughout the network.

16. The optical switching node of claim 14, wherein multiple identical headers are sent throughout the network until the destination location sends the source location a handshake signal acknowledging receipt of the headers.

17. A method for transmitting optical data packets from source locations to destination locations within an optical network, wherein the optical data packet includes a header and a data payload portion, wherein the method comprises the steps of:

interconnecting the locations of the network together with a plurality of optical switching nodes;

receiving the header, translating the header into routing information, eliminating the header, receiving the routing information, and configuring an all optical path within the nodes; and sending multiple identical headers throughout the network so that subsequent switching nodes can receive and read the header for setting up an optical data path.

18. The method of claim 17, wherein the network has a finite number of optical switching nodes in the network and a predetermined finite number of multiple identical headers are sent throughout the network.

19. The method of claim 18, wherein a finite number of multiple identical headers equal to the maximum number of optical switching nodes in a communication path are sent throughout the network.

20. The method of claim 17, wherein said network has an infinite number of optical switching nodes in the network and wherein an infinite number of multiple identical headers are sent throughout the network.

21. The method of claim 20, wherein multiple identical headers are sent throughout the network until the destination location sends the source location a handshake signal acknowledging receipt of the headers.

* * * * *